US012795276B2

(12) United States Patent
Shi et al.

(10) Patent No.: US 12,795,276 B2
(45) Date of Patent: Nov. 10, 2026

(54) SPEAKER BOX

(71) Applicant: AAC Microtech (Changzhou) Co., Ltd., Changzhou City (CN)

(72) Inventors: Yang Shi, Changzhou (CN); Xiaodong Liu, Changzhou (CN); Shuai Li, Changzhou (CN); Chao Zhang, Changzhou (CN)

(73) Assignee: AAG Microtech (Changzhou) Co., Ltd., Changzhou City (CN)

( * ) Notice: Subject to any disclaimer, the term of this patent is extended or adjusted under 35 U.S.C. 154(b) by 188 days.

(21) Appl. No.: 18/963,574

(22) Filed: Nov. 28, 2024

(65) Prior Publication Data

US 2026/0095687 A1 Apr. 2, 2026

Related U.S. Application Data

(63) Continuation of application No. PCT/CN2024/122187, filed on Sep. 29, 2024.

(51) Int. Cl.

| | |
|---|---|
| ***H04R 1/02*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............... *H04R 1/025* (2013.01); *H04R 7/04* (2013.01); *H04R 7/18* (2013.01); *H04R 9/025* (2013.01); *H04R 9/045* (2013.01); *H04R 9/06* (2013.01); *H04R 2400/11* (2013.01)

(58) Field of Classification Search

CPC . H04R 1/025; H04R 7/04; H04R 7/18; H04R 9/025; H04R 9/045; H04R 9/06; H04R 2400/11

See application file for complete search history.

(56) References Cited

U.S. PATENT DOCUMENTS

| | | | | |
|---|---|---|---|---|
| 11,722,823 B2 * | 8/2023 | Yang | ...................... | H04R 1/026 381/412 |
| 2018/0167738 A1 * | 6/2018 | Liu | ...................... | H04R 31/006 |
| 2023/0179921 A1 * | 6/2023 | Song | ...................... | H04R 9/043 381/398 |

* cited by examiner

*Primary Examiner* — Paul W Huber

(74) *Attorney, Agent, or Firm* — Wlersch Law Group

(57) ABSTRACT

The present disclosure discloses a speaker box including a housing having a receiving space and a speaker unit received in the receiving space. The speaker unit includes a frame fixed on the support wall and spaced apart from the location wall, a vibration system mounted on the frame, including a diaphragm and a coil, a magnet system. The diaphragm includes a dome, an inner edge portion e, a folded ring, an outer edge portion, and a connection portion connected with the folded ring and the outer edge portion. The outer edge portion is glued to the support wall. The connection portion includes at least one first connection portion opposite to the location wall; the at least one first connection portion is a plate structure perpendicular with the vibration direction.

11 Claims, 5 Drawing Sheets

SPEAKER BOX

FIELD OF THE PRESENT DISCLOSURE

The present disclosure relates to electric-acoustic conversion technologies, especially relates to a speaker box applied in portable mobile terminals.

DESCRIPTION OF RELATED ART

With the development of the portable mobile terminal technologies, users have increasingly high requirements for the sound quality of portable mobile terminals. And a speaker box in portable mobile terminals is one of the necessary conditions to achieve this high-quality sound effect, which is configured to achieve conversion between electric signal and acoustic signal.

In related art, the speaker box includes a housing having a receiving space and a speaker unit received in the housing. The housing includes a support wall extended towards the receiving space. The speaker unit includes a frame, a vibration system mounted on the frame, and a magnet system configured to drive the vibration system. The vibration system includes a diaphragm mounted on the frame and a coil. The edge of the diaphragm is fixed to the frame. When mounting the speaker unit onto the support wall of the housing, a location wall provided on the housing is configured for installation positioning. The location wall is opposite to the frame. Owing that the gap between the location wall and the frame is too narrow to receive the glue between the support wall and the diaphragm, the glue is prone to overflow on the diaphragm resulting in reduction of the acoustic performance of the speaker box.

Therefore, it is necessary to provide an improved speaker box to overcome the problems mentioned above.

SUMMARY OF THE INVENTION

One object of the present disclosure is to provide a speaker box with higher acoustic performance.

The speaker box includes a housing, having a receiving space, including: a support wall extended towards the receiving space; and a location wall; a speaker unit received in the receiving space and mounted on the support wall, including: a frame fixed on the support wall and spaced apart from the location wall; a vibration system mounted on the frame, including: a diaphragm mounted on the frame; and a coil fixed to the diaphragm; a magnet system configured to drive the vibration system to vibrate; wherein the diaphragm includes a dome, an inner edge portion surrounding the dome, a folded ring surrounding the inner edge portion, an outer edge portion surrounding the folded ring and fixed to the frame, and a connection portion connected with the folded ring and the outer edge portion; the outer edge portion is glued to the support wall; the outer edge portion is sandwiched between the support wall and the frame along a vibration direction of the diaphragm; the connection portion includes at least one first connection portion opposite to the location wall; the at least one first connection portion is a plate structure perpendicular with the vibration direction.

As an improvement, the connection portion further includes a concave portion connected with the first connection portion, the concave portion depresses along the vibration direction.

As an improvement, the diaphragm is in a rounded rectangle shape; the concave portion further includes a second connection portion located at corner position, the first connection portion is connected with the second connection portion.

As an improvement, the concave portion further includes a third connection portion extended along a long axis; the first connection portion is connected with the second connection portion and the third connection portion.

As an improvement, the concave portion further includes a fourth connection portion extended along a short axis; the first connection portion is connected with the second connection portion and the fourth connection portion.

As an improvement, the first connection portion and a surface of the outer edge portion away from the frame are located in a same plane.

As an improvement, the second connection portion, the third connection portion, and the fourth connection portion are all concave away from the magnet system along the vibration direction.

As an improvement, the folded ring is concave towards the magnet system along the vibration direction.

As an improvement, along a direction perpendicular with the vibration direction and parallel with the long axis or the short axis, a width of the folded ring is larger than a width of the connection portion.

As an improvement, the outer edge portion includes a bottom portion glued to the support wall; the bottom wall comprises an inner edge connected with the connection portion, and an outer edge facing the location wall; the outer edge portion further includes a first side wall extended from outer edge away from the diaphragm along the vibration direction, and a second side wall extended from the inner edge away from the diaphragm along the vibration direction; the first side wall and the second side wall are both glued to the frame.

As an improvement, a height of the first side wall along the vibration direction is larger than a height of the second side wall along the vibration direction.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
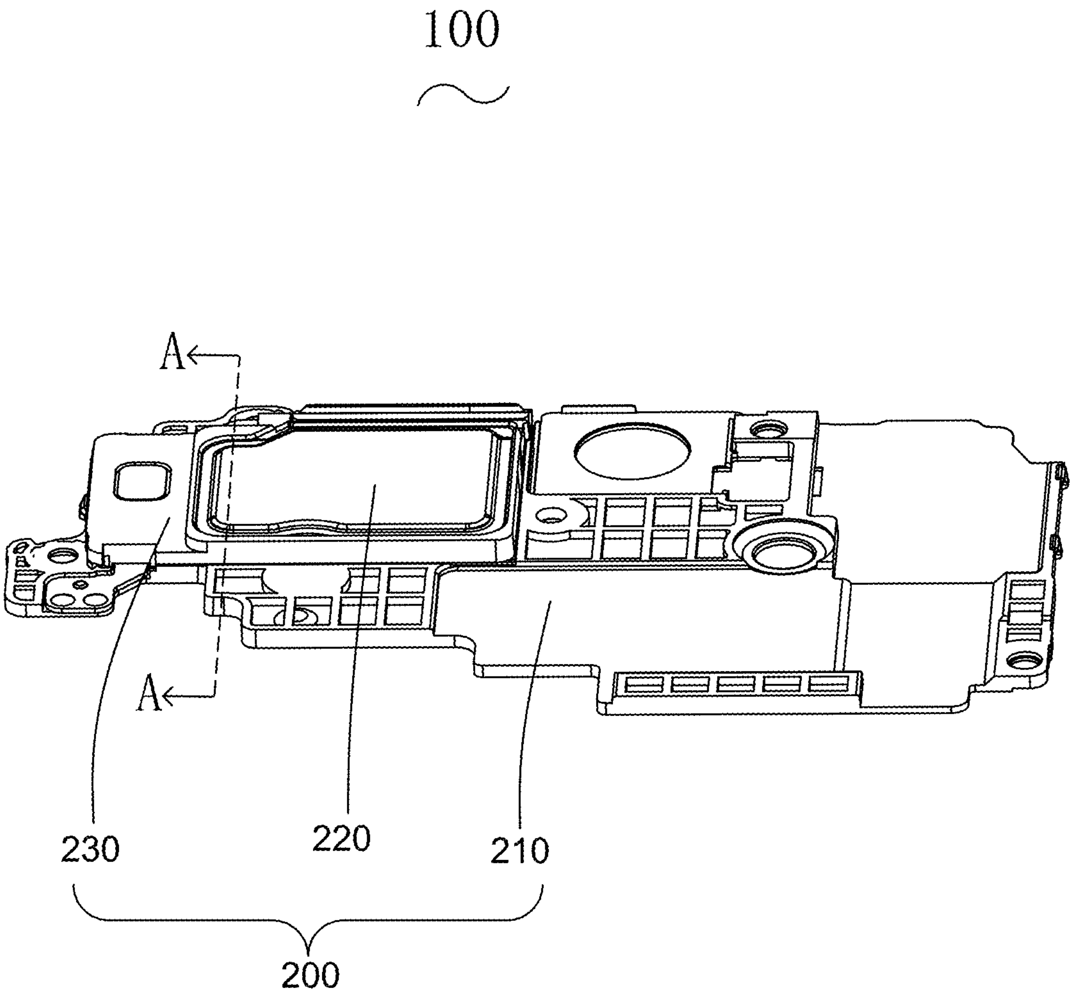
FIG. 1 is an isometric view of a speaker box in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-5 together, a speaker box 100 provided by an exemplary embodiment of the present disclosure includes a housing 200 having a receiving space 201, and a speaker unit 300 received in the receiving space 201. The receiving space 201 is communicated with outside by a sound hole 2100 provided on the housing 200. The sound wave generated by the speaker unit 300 is transmitted to outside through the sound hole 2100.

To be specific, the housing 200 includes upper shell 210, a bottom shell 220, and a middle shell 230 mounted between the upper shell 210 and the bottom shell 220. The receiving space 201 is enclosed by the upper shell 210, the bottom shell 220 and the middle shell 230 jointly. The middle shell 230 includes a support wall 2301 extended towards the receiving space 201 for mounting the speaker unit 300 thereon.

Figure 2:
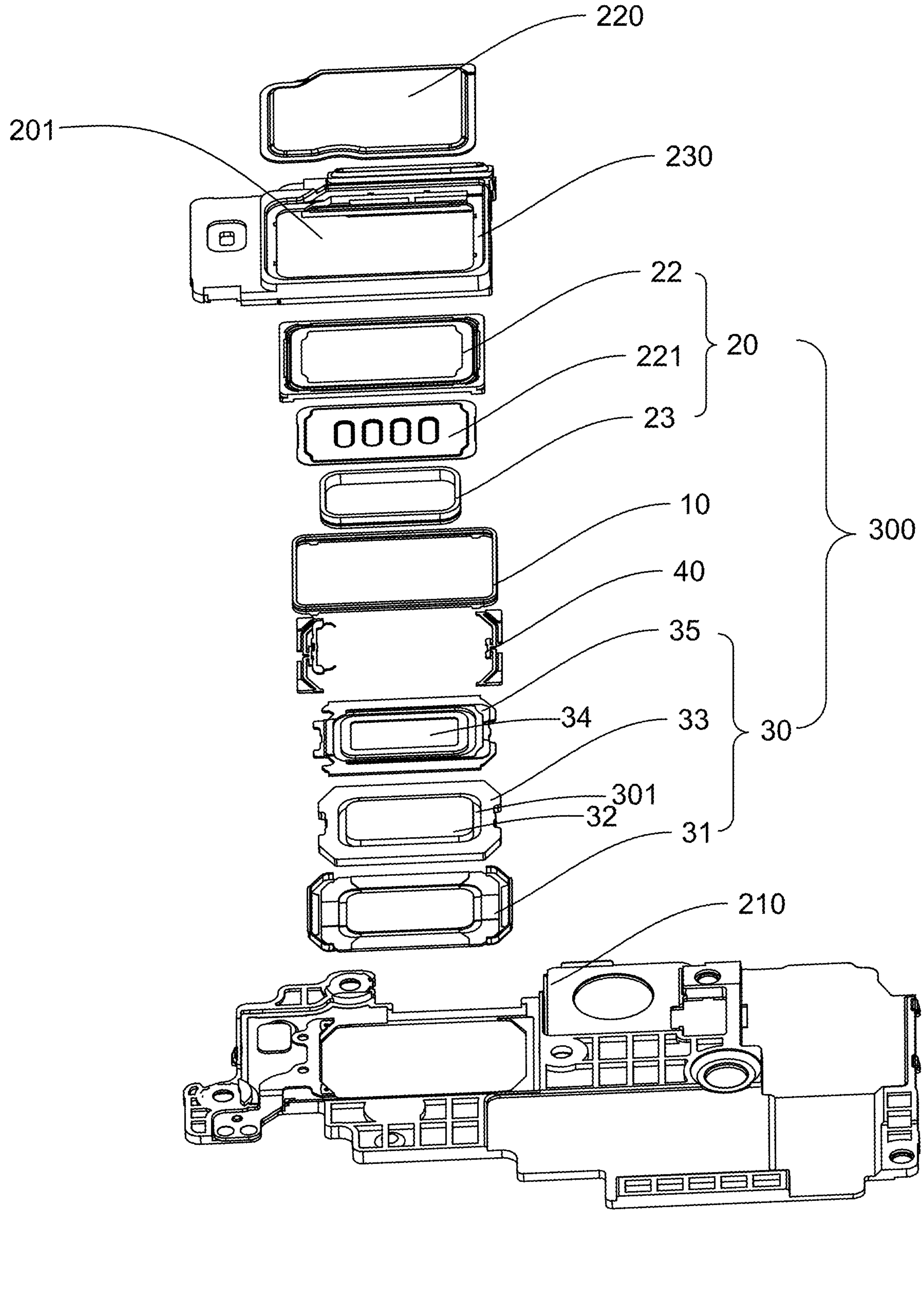
FIG. 2 is an exploded view of the speaker box in FIG. 1.
Figure 3:
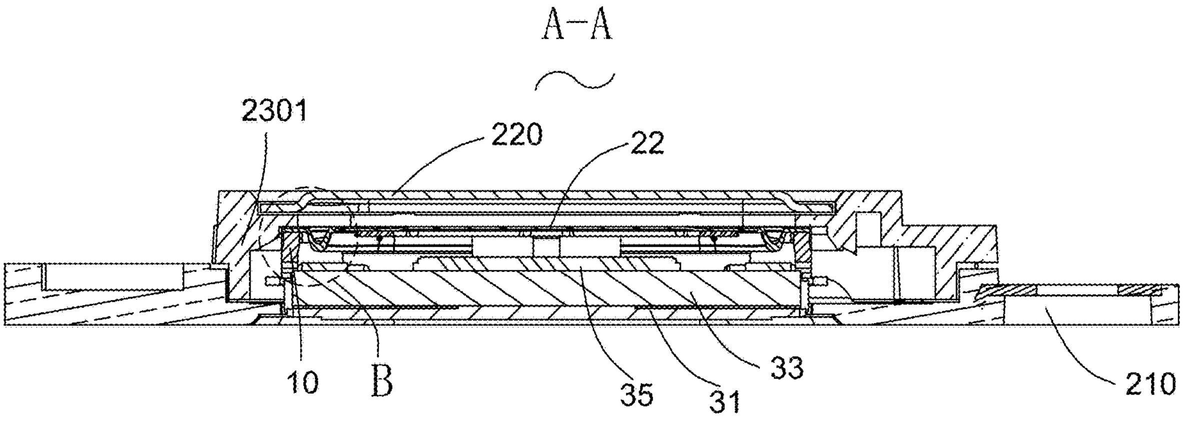
FIG. 3 is a cross-sectional view of the speaker box taken along line A-A in FIG. 1.

As shown in FIGS. 2-3, the speaker unit 30 includes a frame 10 fixed on the support wall 2301, a vibration system 20 mounted on the frame 10, a magnet system 30 configured to drive the vibration system 20 to vibrate, a flexible circuit board 40 electrically connected the speaker unit 300 with external circuit board. The vibration system 20 and the magnet system 30 are mounted on the frame 10.

As shown in FIGS. 2-3, the vibration system 20 includes a diaphragm 22 mounted on the frame 10, and a coil 23 configured to drive the diaphragm 22 to generate sound wave. The coil 23 is electrically connected with the flexible circuit board 40. When the speaker unit 300 is electrically activated, the coil 23 is driven by the magnet system 30, thus driving the diaphragm 22 to vibrate to generate sound. Wave.

Furthermore, the magnet system 30 includes a yoke 31 mounted on the frame 10, a main magnet unit 32 and a side magnet unit 33 arranged on a side of the yoke 31 facing the vibration system 20. The main magnet unit 32 is surrounded by the side magnet unit 33 forming a magnet gap 301. The coil 23 is inserted into the magnet gap 301. The magnet system 30 further includes a main magnetic plate 34 provided on the main magnet unit 32, and a side magnetic plate 35 provided on the side magnet unit 33. The side magnetic plate 35 is fixed to the frame 10 to suspend the magnet system 30 on the frame 10.

Please refer to FIGS. 2-8, the middle shell 230 further includes a location wall 2302 spaced apart from the frame 10 and located on the support wall 2301. The diaphragm 22 includes a dome 221 located at central position, an inner edge portion 223 surrounding the dome 221, a folded ring 222 surrounding the inner edge portion 223, an outer edge portion 224 surrounding the folded ring 222 and fixed to the frame 10, and a connection portion 225 connected with the folded ring 222 and the outer edge portion 224. The outer edge portion 224 is sandwiched the support wall 2301 and the frame 10 along a vibration direction of the diaphragm 22.

Specifically, the connection portion 225 includes a first connection portion 2251 opposite to the location wall 2302 and a concave portion 2250 connected with the first connection portion 2251. The concave portion 2250 depresses along the vibration direction. The first connection portion 2251 is a plate structure perpendicular with the vibration direction. The first connection portion 2251 and a surface of the outer edge portion 224 away from the frame 10 are located in a same plane.

In one embodiment, the diaphragm 22 is in a rounded rectangle shape. The concave portion 2250 includes a second connection portion 2252 located at corner position, a third connection portion 2253 extended along a long axis, and a fourth connection 2254 portion extended along a short axis. The first connection portion 2252 is connected with the second connection portion. Furthermore, the connection portion 225 includes a plurality of the first connection portions 2251. The first connection portions 2251 are arranged at intervals from each other. The first connection portion 2251 is connected with the second connection portion 2252 and the third connection portion 2253. The first connection portion 2251 is connected with the second connection portion 2252 and the fourth connection portion 2254. The second connection portion 2252, the third connection portion 2253, and the fourth connection portion 2254 are spaced apart from each other. Adjacent second connection portion 2252 and third connection portion 2253 is connected by the first connection portion 2251. Similarly, Adjacent second connection portion 2252 and fourth connection portion 2254 is connected by the first connection portion 2251. Specifically, the connection portion 225 includes four second connection portions 2252, two third connection portions 2253, and two fourth connection portions 2254.

Please refer to FIGS. 2-7, the folded ring 222 is concave towards the magnet system 30 along the vibration direction. The concave portion 2250 is concave away from the magnet system 30 along the vibration direction, meaning that the second connection portion 2252, the third connection portion 2253, and the fourth connection portion 2254 are all concave away from the magnet system 30 along the vibration direction. Along a direction perpendicular with the vibration direction and parallel with the long axis or the short axis, a width of the folded ring 222 is larger than a width of the connection portion 225.

Please refer to FIGS. 4-8, the location wall 2302 provided on the support wall 2301 is configured to achieve positioning to improve positioning precision when mounting the speaker unit 300 on the housing 200. Thus, the gap between the location wall 2301 and the frame 10 is relatively narrow. When the outer edge portion 224 of the diaphragm, 22 is glued to the support wall 2301, the gap between the location wall 2301 and the frame 10 is too narrow to receive the overflowed glue. The redundant glue then overflow to the first connection portion 2251. In the present disclosure, the first connection portion 2251, which is a plate structure perpendicular with the vibration direction, is configured to receive the overflowed glue thereby avoiding the reduction of the glue to the acoustic performance of diaphragm 22.

Figure 4:
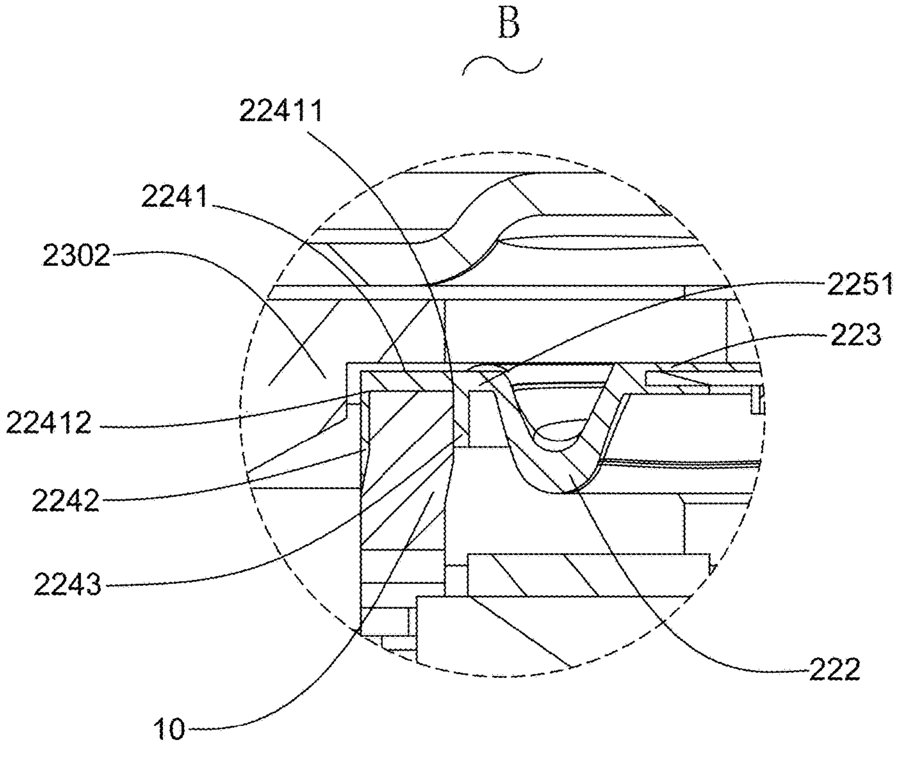
FIG. 4 is an enlarged view of part B in FIG. 3.
Figure 5:
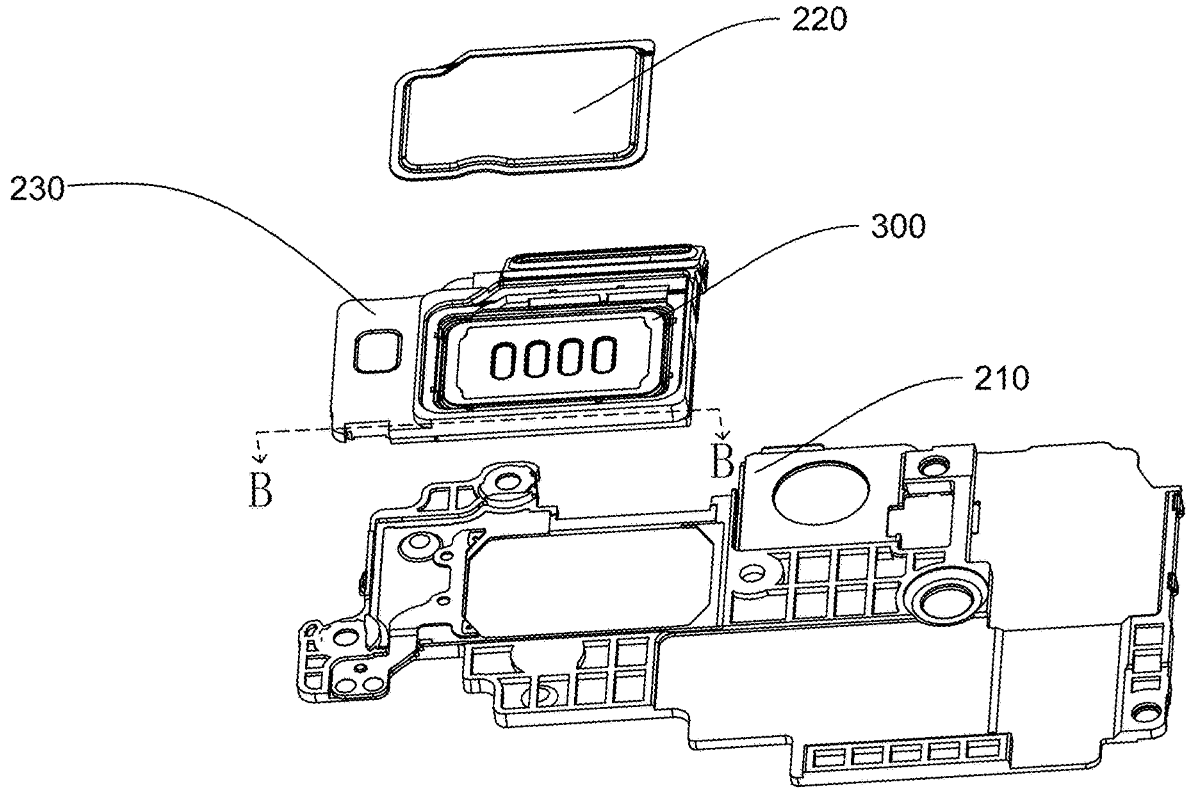
FIG. 5 is an exploded view the speaker box in FIG. 1.
Figure 6:
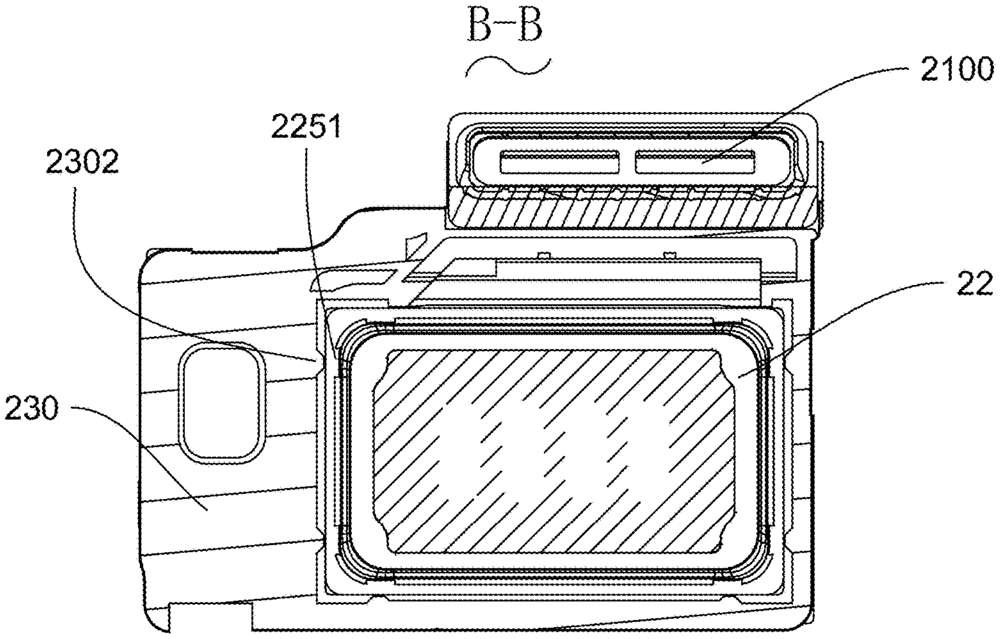
FIG. 6 is a cross-sectional view of the speaker box taken along line B-B in FIG. 5
Figure 7:
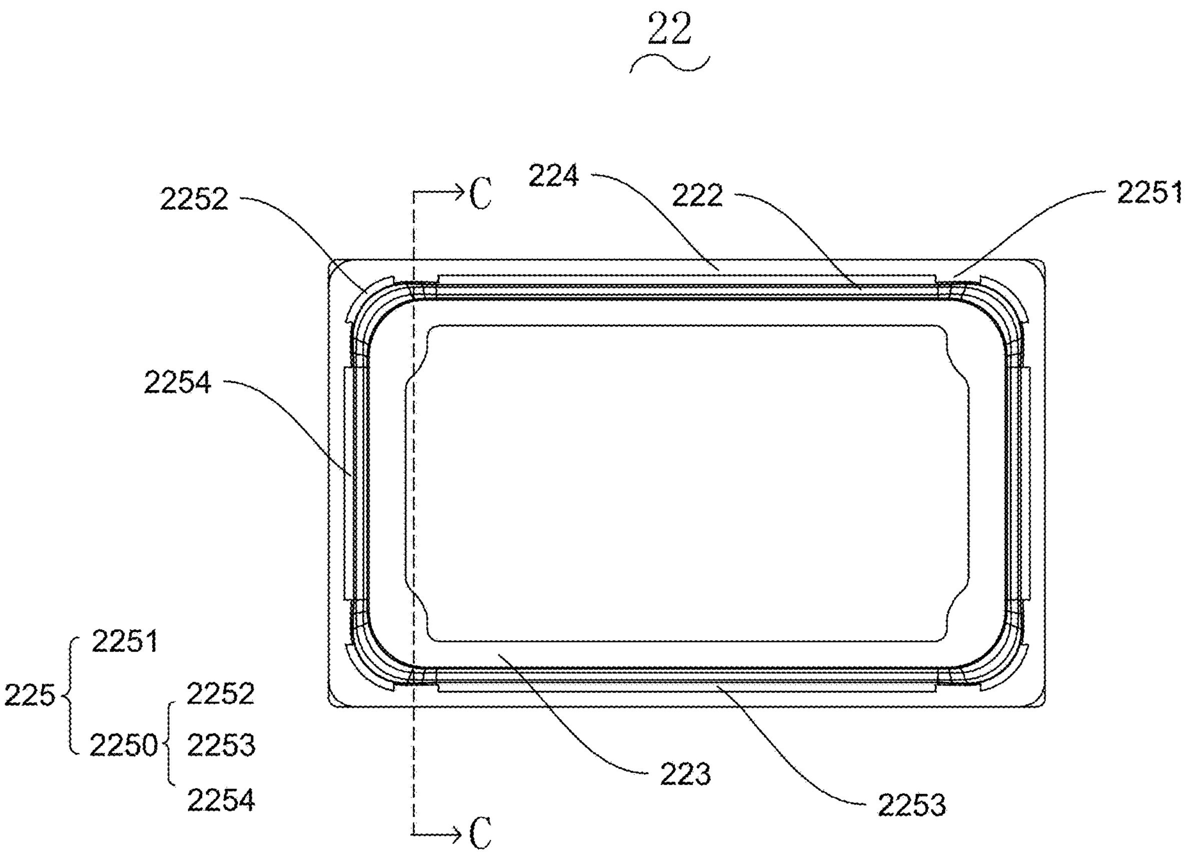
FIG. 7 is an isometric view of a diaphragm of the speaker box in FIG. 1.
Figure 8:
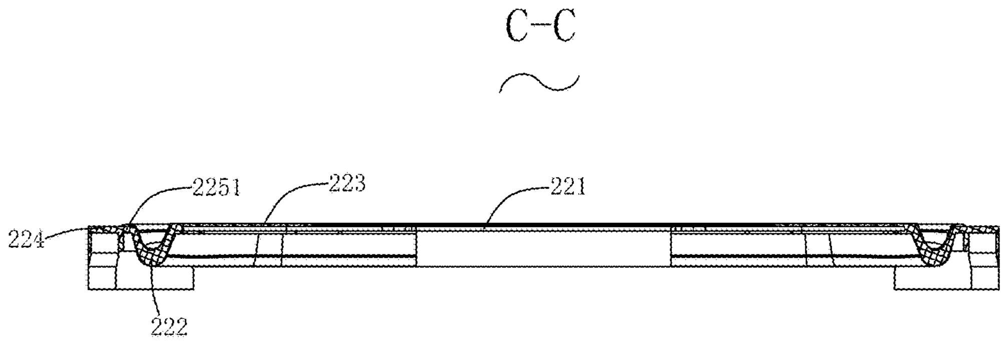
FIG. 8 is a cross-sectional view of the diaphragm taken along line C-C in FIG. 7.

As shown in FIG. 4, the outer edge portion 224 includes a bottom portion 2241 glued to the support wall 2301. The bottom wall 2241 includes an inner edge 22411 connected with the connection portion 225, and an outer edge 22412 facing the location wall 2302. The outer edge portion 224 further includes a first side wall 2242 extended from outer edge 22411 away from the diaphragm 22 along the vibration direction, and a second side wall 2243 extended from the inner edge 22411 away from the diaphragm 22 along the vibration direction. The first side wall 2242 and the second side wall 2243 are both glued to the frame 10. In one embodiment, a height of the first side wall 2242 along the vibration direction is larger than a height of the second side wall 2243 along the vibration direction Compared with the related art, the speaker box in the present disclosure includes a housing having a receiving space and a speaker unit received in the receiving space. When mounting the speaker unit to the housing, the location wall on the housing is provided to improve the positioning precision. The outer edge portion fixed to the frame of the speaker unit is glued to the support wall on the housing. By providing the first connection portion with a plate structure perpendicular with the vibration direction, the glue overflowed from the outer edge portion and the support wall which cannot be received by the gap between the location wall and the frame is received by the first connection portion, thereby effectively avoiding the reduction of the acoustic performance of the diaphragm and ensuring the sound quality of speaker box.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box comprising:

a housing, having a receiving space, comprising:

a support wall extended towards the receiving space; and a location wall;

a speaker unit received in the receiving space and mounted on the support wall, comprising:

a frame fixed on the support wall and spaced apart from the location wall;

a vibration system mounted on the frame, comprising:

a diaphragm mounted on the frame; and a coil fixed to the diaphragm;

a magnet system configured to drive the vibration system to vibrate;

wherein the diaphragm comprises a dome, an inner edge portion surrounding the dome, a folded ring surrounding the inner edge portion, an outer edge portion surrounding the folded ring and fixed to the frame, and a connection portion connected with the folded ring and the outer edge portion;

the outer edge portion is glued to the support wall; the outer edge portion is sandwiched between the support wall and the frame along a vibration direction of the diaphragm;

the connection portion comprises at least one first connection portion opposite to the location wall; the at least one first connection portion is a plate structure perpendicular with the vibration direction.

2. The speaker box as described in claim 1, wherein the connection portion further comprises a concave portion connected with the first connection portion, the concave portion depresses along the vibration direction.

3. The speaker box as described in claim 2, wherein the diaphragm is in a rounded rectangle shape; the concave portion further includes a second connection portion located at corner position, the first connection portion is connected with the second connection portion.

4. The speaker box as described in claim 3, wherein the concave portion further comprises a third connection portion extended along a long axis; the first connection portion is connected with the second connection portion and the third connection portion.

5. The speaker box as described in claim 4, wherein the concave portion further comprises a fourth connection portion extended along a short axis; the first connection portion is connected with the second connection portion and the fourth connection portion.

6. The speaker box as described in claim 1, wherein the first connection portion and a surface of the outer edge portion away from the frame are located in a same plane.

7. The speaker box as described in claim 5, wherein the second connection portion, the third connection portion, and the fourth connection portion are all concave away from the magnet system along the vibration direction.

8. The speaker box as described in claim 7, wherein the folded ring is concave towards the magnet system along the vibration direction.

9. The speaker box as described in claim 5, wherein along a direction perpendicular with the vibration direction and parallel with the long axis or the short axis, a width of the folded ring is larger than a width of the connection portion.

10. The speaker box as described in claim 1, wherein the outer edge portion comprises a bottom portion glued to the support wall; the bottom portion comprises an inner edge connected with the connection portion, and an outer edge facing the location wall; the outer edge portion further comprises a first side wall extended from outer edge away from the diaphragm along the vibration direction, and a second side wall extended from the inner edge away from the diaphragm along the vibration direction; the first side wall and the second side wall are both glued to the frame.

11. The speaker box as described in claim 10, wherein a height of the first side wall along the vibration direction is larger than a height of the second side wall along the vibration direction.

* * * * *